United States Patent [19]

Immler

[11] 4,320,336
[45] Mar. 16, 1982

[54] CIRCUIT ARRANGEMENT FOR THE ON-OFF SWITCHING OF A LINE VOLTAGE TO AND FROM A LOAD

[75] Inventor: Josef Immler, Puchheim, Fed. Rep. of Germany

[73] Assignee: Siemens Aktiengesellschaft, Berlin & Munich, Fed. Rep. of Germany

[21] Appl. No.: 234,996

[22] Filed: Feb. 17, 1981

Related U.S. Application Data

[63] Continuation of Ser. No. 13,117, Feb. 21, 1979, abandoned.

[30] Foreign Application Priority Data

Feb. 21, 1978 [DE] Fed. Rep. of Germany ....... 2807400

[51] Int. Cl.$^3$ ............................................. G05F 1/455
[52] U.S. Cl. ................... 323/324; 323/319; 323/910
[58] Field of Search ............. 318/345 D, 345 H, 798, 318/799, 805, 812; 323/235, 239, 319, 324, 910; 307/252 B

[56] References Cited

U.S. PATENT DOCUMENTS

| | | | |
|---|---|---|---|
| 3,414,766 | 12/1968 | Miller | 315/194 |
| 3,663,950 | 5/1972 | Bartlett | 323/319 |
| 3,706,913 | 12/1972 | Malatchi | 315/292 |
| 4,101,819 | 7/1978 | Maeda et al. | 323/320 |
| 4,162,440 | 7/1979 | Luteran | 323/239 |
| 4,176,307 | 11/1979 | Parker | 318/798 |

FOREIGN PATENT DOCUMENTS

2061442 6/1972 Fed. Rep. of Germany .

OTHER PUBLICATIONS

IBM Technical Disclosure Bulletin, "Complete Half-Wave Thyristor Control," vol. 16, No. 9, p. 2962, Feb. 1974.
Memoirs of the Faculty of Engineering, Kobe University, No. 20, pp. 165–167, Mar. 1974.
International Rectifier Application Note An-A-13, "The 200 AMP Logic Triac,".

*Primary Examiner*—William H. Beha, Jr.
*Attorney, Agent, or Firm*—Hill, Van Santen, Steadman, Chiara & Simpson

[57] ABSTRACT

A circuit arrangement contains an oscillator for producing high frequency pulses, a gate circuit, a pulse transformer and a triac. The high frequency pulses can be connected to the primary winding of the transformer by way of the gate circuit. The secondary winding of the transformer is connected in the control circuit of the triac. The line voltage load is connected in the output circuit of the triac. A switch is arranged at the output of the gate circuit and is connected to the primary winding of the transformer. The switch is closed only during the presence of one polarity of the pulses so that a current can only flow through the primary winding of the transformer during a corresponding interval.

3 Claims, 2 Drawing Figures

CIRCUIT ARRANGEMENT FOR THE ON-OFF SWITCHING OF A LINE VOLTAGE TO AND FROM A LOAD

This is a continuation of application Ser. No. 013,117, filed Feb. 21, 1979, abandoned.

BACKGROUND OF THE INVENTION

1. Field of the Invention

The present invention relates to a circuit arrangement for switching on or switching off line voltage with respect to a line voltage load, in which an oscillator produces a high frequency pulses which are fed to a transformer by way of a gate circuit, the transformer having a secondary winding which is connected to a control circuit of a triac, and in which the line voltage load and the line voltage are connected in the output circuit of the triac.

2. Description of the Prior Art

A circuit arrangement of the type generally set forth above is known, for example from the publication "Electronics", 1972, Vol. 4, pp. 113-114. In this prior art circuit, the line voltage is connected to a load with the aid of a triac. The triac is triggered by high-frequency pulses which can be connected to a pulse transformer with the aid of a gate circuit. The high-frequency rectangular pulses are produced by a multivibrator. The secondary winding of the transformer is connected in the input circuit or the control circuit of a triac. Therefore, a high-frequency rectangular ac current occurs at the input of the triac. The triac is switched on by means of high-frequency rectangular ac current and, therefore, the load is connected to the line voltage by the triac. This circuit arrangement has the disadvantage that the rectangular pulses must be transmitted by way of the transformer and, thereby rectangular ac current pulses flow in the control circuit of the triac. An essential disadvantage of the circuit arrangement can be seen in that the voltage rise on the load is not limited in the output circuit of the triac at the instant of switch-on.

SUMMARY OF THE INVENTION

The object of the present invention is to provide a circuit arrangement for switching line voltage on and off with respect to a line voltage load, which only requires a small expense and with the aid of which line voltage loads of small output can be triggered with an arbitrary cos $\phi$.

This object is achieved in that a switch is arranged between the gate circuit and the transformer, the switch being connected to the primary winding of the transformer and closed only in response to one polarity of the high-frequency pulses.

Therefore, the transformer for firing the triac, hereinafter referred to as the ignition transformer, is triggered on a unipolar basis, i.e. a current only flows through the primary winding of the ignition transformer when a specified polarity of the pulses is applied, as the switch is only closed during this time. During this time, a current flows in the control circuit of the triac in the one direction by means of which the triac is ignited. Simultaneously, the electromagnetic energy in the ignition transformer is built up during this time. After the switch is opened, the electromagnetic energy of the ignition transformer in the control circuit of the triac decreases, a current flows now in the other direction by means of which the triac is held in the ignited condition. By a corresponding dimensioning it is provided that the triac is conductively controlled during the total period time of the pulses. Advantageously, the keying ratio of the pulses is adjusted to approximately 1:2. It is therefore guaranteed that a sufficient magnetization is present after the switch is opened.

The switch can simply be realized with the aid of a transistor whose base is connected to the output of the gate circuit and whose collector-emitter path is connected between a first fixed potential and one terminal of the primary winding of the ignition transformer, while the other terminal of the primary winding is connected to a different fixed potential.

It is advantageous to design the triac circuit such that a resistor is arranged in series with the triac and that a capacitor is provided in parallel to the series combination of the triac and the resistor. A voltage rise at the line voltage load is prevented by the circuit if the load current in the output circuit has not yet reached the holding current of the triac at the switching time of the high frequency pulse. Moreover, a high voltage steepness for the load is avoided when the switching on or switching off is not done during the zero passage of the line voltage. Additionally, the resistor forms a protection for the triac, a fuse replacement when the load is shorted in the case of trouble.

If the triac is only to be switched on and switched off during the zero passage of the line voltage, it is advantageous to arrange a zero passage detector at the control input of the gate circuit, which determines the zero passages of the line voltage.

BRIEF DESCRIPTION OF THE DRAWINGS

Other objects, features and advantages of the invention, its organization, construction and operation will be best understood from the following detailed description, taken in conjunction with the accompanying drawings, on which.

DESCRIPTION OF THE PREFERRED EMBODIMENTS

Figure 1:
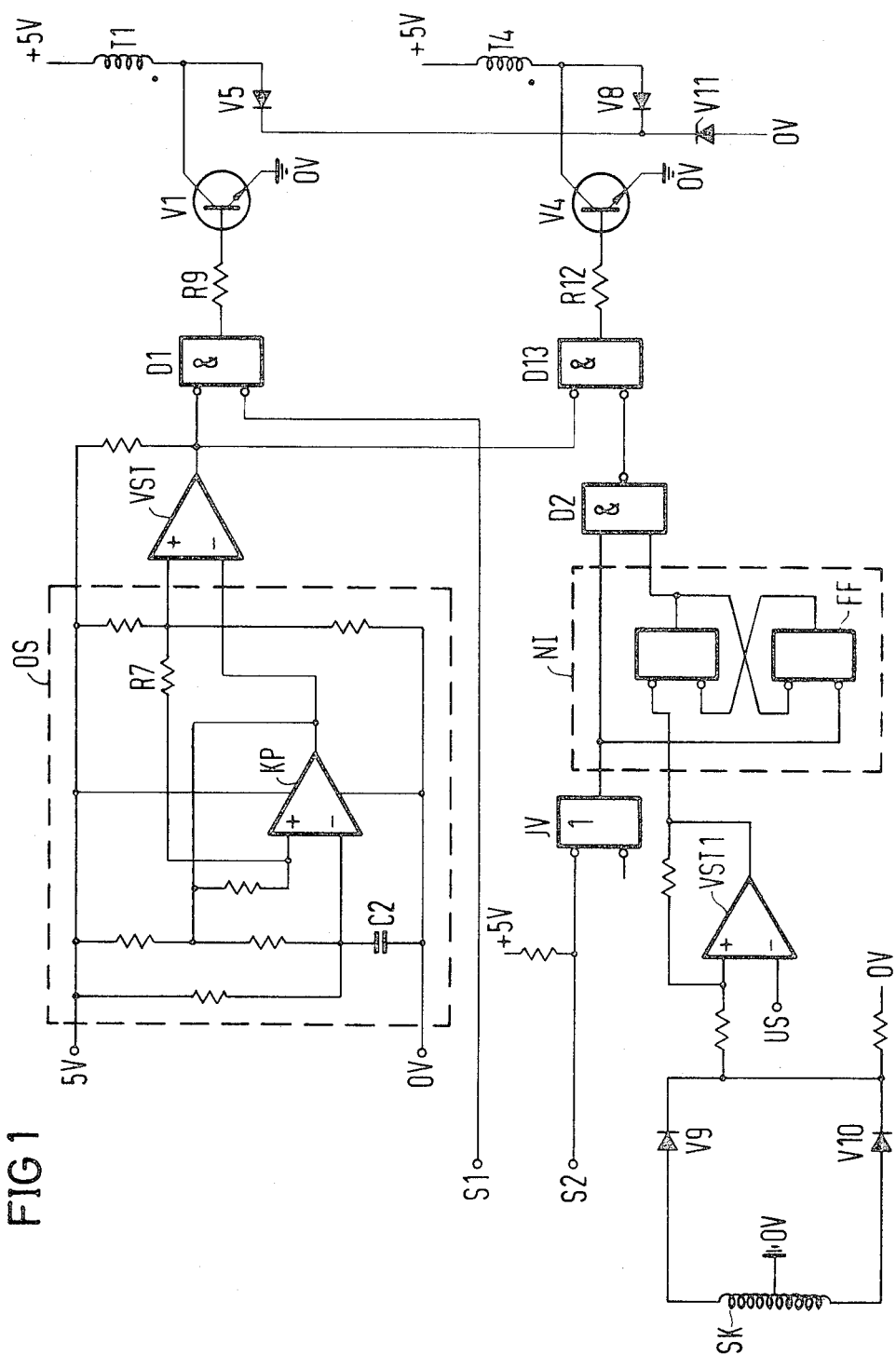
FIG. 1 is a schematic circuit diagram of a trigger circuit for a triac of a circuit arrangement for switching on and switching off line voltage to a line load, according to the present invention.

FIG. 1 illustrates the trigger circuit of the circuit arrangement. An oscillator OS is provided for generating high-frequency pulses which are used as the timing pulses. The frequency of the timing pulses, for example, can be approximately 100 KHz. As the design of the oscillator is not essential to the invention, the oscillator circuit is not explained in further detail herein. It contains a comparator KP having an input connected to a capacitor C2 and another input which receives a feedback by way of a coupling resistor R7. The remaining resistors illustrated on the drawing are used for adjusting the working point of the comparator KP.

The timing pulses are amplified by an amplifier VST and are fed to a gate circuit D1, in this particular embodiment constructed as an AND gate.

The output of the AND gate D1 is connected to a transistor switch V1 by way of a resistor R9. The emitter of the transistor switch V1 is connected to a fixed potential, for example, zero volt. The collector of the transistor switch V1 is connected to a primary winding of an ignition transformer T1. The other terminal of the primary winding is connected to an additional fixed potential of, for example, 5 volt.

In the exemplary embodiment illustrated in FIG. 1, the timing pulses are not only fed to the AND gate D1 but also to an additional AND gate D13. This corresponds completely with the AND gate D1. At the output of the AND gate D13 a transistor switch V4 has its base connected to the gate D13 by way of a resistor R12. The transistor switch V4 has a collector-emitter circuit connected between a first fixed potential, for example, zero volt and one terminal of the primary winding of an ignition transformer T4, whose other terminal is connected to a second fixed potential, for example, 5 volt.

The terminals of the ignition transformers T1 and T4 which are connected to the transistor switches V1 and V4 are additionally connected to a Zener diode V11 by way of respective diodes V5 and V8. One terminal of the Zener diode V11 is connected to fixed potential, for example, zero volt.

A zero passage detector N1 is connected to a control input of the AND gate D13. With the aid of the zero passage detector N1 it is determined when the ac line voltage goes through the zero point. For this purpose, the secondary winding SK of a network transformer is also utilized. A rectifier circuit having a pair of diodes V9 and V10 are connected to the secondary winding SK for rectifying the ac voltage. The rectified ac voltage is amplified in an amplifier VST1 and fed to a flip-flop FF. The flip-flop FF is set when the ac voltage passes zero and the control signal S2 is connected. The output of the flip-flop FF is connected to an AND gate D2. The output of an inverter IV is connected to the other input of the AND gate D2, the inverter having an input which receives the control signal S2.

If the ignition transformer T4 is to be triggered, the control signal S2 is applied. The AND gate D2 therefore is opened so that the signal from the flip-flop FF can be transmitted to the AND gate D13. The resetting of the flip-flop FF also proceeds with the aid of the control signal S2.

Figure 2:
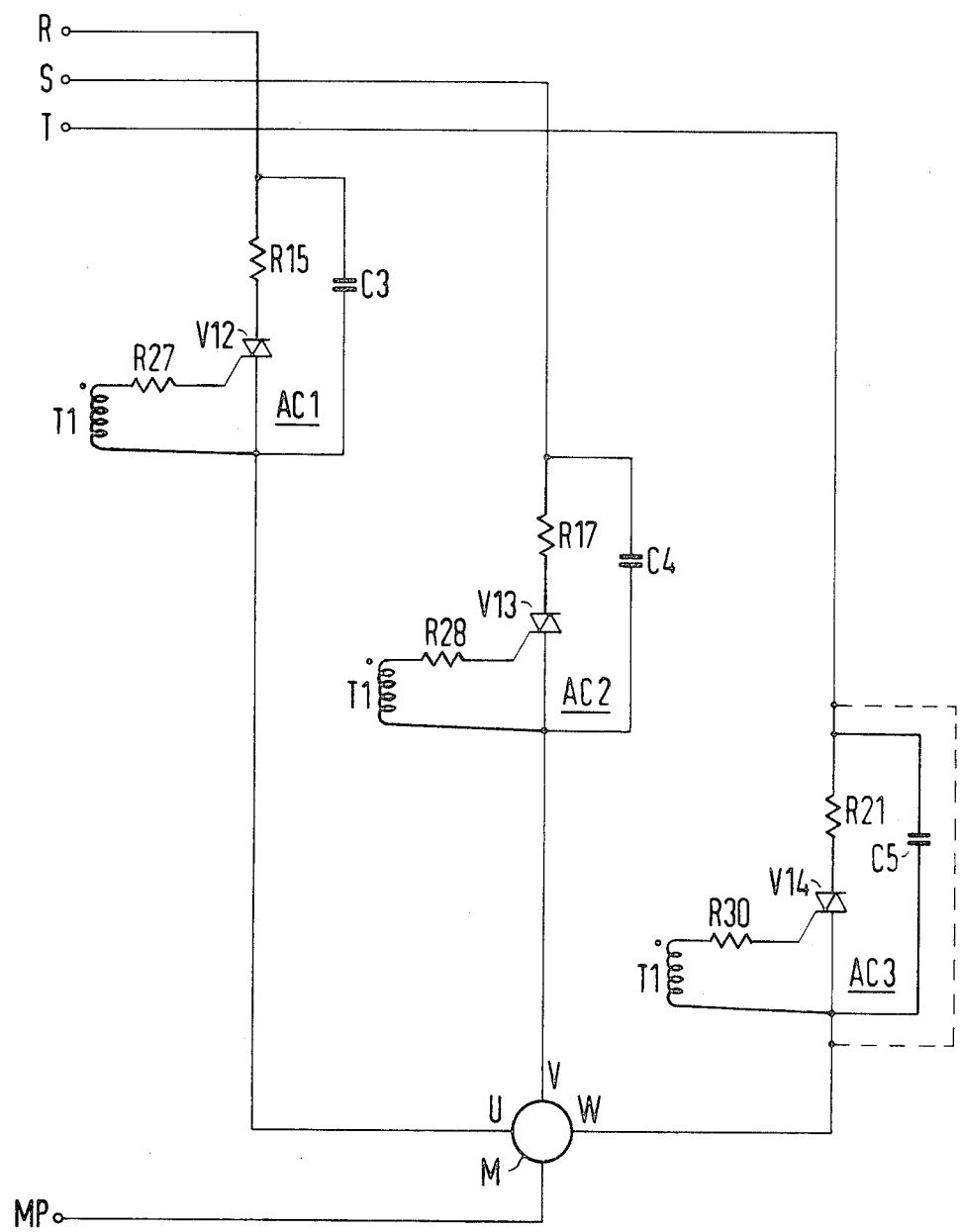
FIG. 2 is a schematic circuit diagram of the output portion of the circuit arrangement illustrated in FIG. 1.

FIG. 2 illustrates a design for the output portion of the circuit arrangement illustrated in FIG. 1. In FIG. 2, three phases R, S, T of a three-phase supply line are to be connected to a line voltage load, for example, to a motor M. For this purpose, three triac circuits AC1, AC2 and AC3, having respective triacs V12, V13 and V14, are arranged between respective phases and corresponding terminals of the motor M. Respective secondary windings of the ignition transformer T1 are connected in the input or control circuits of the respective triacs V12, V13 and V14 of the triac circuits AC1, AC2 and AC3. Additionally, respective resistors R27, R28 and R30 are connected in respective input circuits.

Each phase of the line voltage R, S, T and the motor M are connected in the output circuit of each triac V12, V13 and V14. Additionally, respective resistors R15, R17 and R21 are connected in series with the triacs. Respective capacitors C3, C4 and C5 are connected in parallel with the series resistor-triac combinations.

The control signal S1 is connected to the AND gate D1 if the motor is to be triggered; therefore, if the line voltage is to be applied to the motor M, the signal S1 is applied. Therefore, the timing pulses of the oscillator OS can be fed to the transistor switch V1. The transistor switch V1 is rendered conductive at the time in which the timing pulses have a predetermined polarity. Therefore, a current from the fixed potential of +5 volt can flow towards zero volt via the primary winding of the ignition transformer T1 and the transistor switch V1. Thereby, a corresponding voltage is formed in the secondary winding of the ignition transformer T1 which produces a current through the triacs V12, V13 and V14. The triacs V12, V13 and V14 are ignited by this current. Simultaneously, electromagnetic energy is built up in the ignition transformer T1. This proceeds in the active phase of the transistor switch V1 during which it is conductive. As soon as the polarity of the timing pulse is altered, the transistor switch V1 is blocked and no current can flow by way of that switch. The electromagnetic energy contained in the ignition transformer T1 is now decreased, whereby a current flows in the opposite direction in the control circuits of the triacs V12, V13 and V14. This current flowing in the opposite direction holds the triacs in a conductive condition. As no new energy is fed, the value of the ignition current is naturally continuously decreased until it has reached a value which is too small to hold the triacs in their conductive conditions. Then, the triacs are again blocked. By a corresponding dimensioning of the circuit arrangement and of the ignition transformer, the triacs V12, V13 and V14 receive the necessary ignition current via the control connection until a period of the timing pulses has almost run out. Then, the transistor switch V1 is again rendered conductive by means of the next timing pulse and the total process begins again.

During the time in which the triacs V12, V13 and V14 are conductive, the corresponding phases R, S and T are connected to the motor M. If the phases R, S and T are to be switched off, the control signal S1 is switched off, the AND gate V1 is blocked and the timing pulses can no longer reach the transistor switch V1. Thereby, the triacs V12, V13 and V14 are blocked as soon as the motor current has fallen below the holding current of the triacs.

The design of the circuit arrangement facilitates very small ignition transformers T, a small component expense, and nevertheless guarantees a dependable ignition with very small, even inductive load currents. A voltage rise for the load is prevented by the resistors R15, R17 and R21 in the output portion of the arrangement when the load current has not yet reached the holding current of the triac at the switching time of the pulse. Additionally, these resistors prevent a high voltage steepness for the load if the switching on or switching off is not done during the zero passage of the line voltage. Finally, these resistors form a protection for the triacs if the load is shorted in the case of trouble.

If the triacs are not to be switched in an arbitrary position of the amplitude of the ac voltage, but rather only during the zero passage, then the timing pulses are only connected to the transistor switch with the aid of the zero passage detector NI, that is when the ac voltage passes through zero. Thereby, the triacs are ignited during the zero passage of the ac voltage. Then, the secondary windings connected in the control circuit of the triacs must then simply be coupled with the primary winding of the ignition transformer T4 in the output portion of FIG. 2.

In the exemplary embodiment illustrated in FIG. 1, only two ignition transformers are connected to the oscillator OS. Additional transformers can be connected to the oscillator with the aid of AND gates D1 and transistor switches V1. Finally, additional transformers can also be connected to the zero passage detector N1 in that corresponding AND gates D1 and transistor switches V1 are provided.

Three triac circuits AC1, AC2 and AC3 are provided for the control of the motor M in the exemplary embodiment discussed above with each triac circuit being connected for a respective phase of the three-phase current. However, it is possible and advantageous to connect only two phases to the motor by way of respective triac circuits, and to connect, however, the third phase directly to the motor M. The star point of the motor is then not connected. FIG. 2, for example, the triac circuit having the triac V14 is then replaced by a bridge, as schematically indicated by the broken line.

Although I have described my invention by reference to particular illustrative embodiments thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. In a circuit arrangement for the on and off switching of a line voltage to a line load in which an oscillator produces cyclic opposite polarity high-frequency rectangular pulses which are fed, via a gate circuit, to the primary winding of a transformer which includes a secondary winding connected to a gate control circuit of a triac, the triac being connected to the line voltage, the improvement therein comprising:

a switch connected between the gate circuit and the primary winding of the transformer, said switch connected in series with the primary winding and operable to close in response to one polarity pulse during a cycle; and a resistor connected in series with the secondary winding and the control gate circuit of the triac, said resistor and the secondary winding dimensioned to maintain conduction of the triac through the other polarity pulse during this cycle.

2. The improved arrangement of claim 1, further defined as comprising:

a capacitor connected in parallel with the triac.

3. The improved arrangement of claim 1, for a three-phase load, wherein:

a respective transformer-triac-resistor-capacitor circuit is connected between the load and respective ones of two of the phases and the third phase is directly connected to the load.

* * * * *